(12) United States Patent
Rebek (10) Patent No.: US 11,286,907 B1
(45) Date of Patent: Mar. 29, 2022

(54) WIND TURBINE MOUNTABLE TO A MOTOR VEHICLE

(71) Applicant: Dennis C. Rebek, West Allis, WI (US)

(72) Inventor: Dennis C. Rebek, West Allis, WI (US)

( * ) Notice: Subject to any disclaimer, the term of this patent is extended or adjusted under 35 U.S.C. 154(b) by 0 days.

(21) Appl. No.: 17/527,547

(22) Filed: Nov. 16, 2021

(51) Int. Cl.
*F03D 9/32* (2016.01)
*F03D 9/25* (2016.01)
*H02K 7/18* (2006.01)

(52) U.S. Cl.
CPC ............... *F03D 9/32* (2016.05); *F03D 9/25* (2016.05); *H02K 7/183* (2013.01); *F05B 2220/706* (2013.01); *F05B 2240/52* (2013.01); *F05B 2240/60* (2013.01); *F05B 2240/941* (2013.01)

(58) Field of Classification Search
CPC ... F03D 9/32; F03D 9/25; H02K 7/183; F05B 2220/706; F05B 2240/52; F05B 2240/60; F05B 2240/941
USPC ....................................................... 290/44, 55
See application file for complete search history.

(56) References Cited

U.S. PATENT DOCUMENTS

| | | | |
|---|---|---|---|
| 4,179,007 A | 12/1979 | Howe | |
| 5,746,283 A * | 5/1998 | Brighton | F03D 9/32 180/65.31 |
| 6,700,215 B2 * | 3/2004 | Wu | F03D 9/32 290/44 |
| 6,897,575 B1 * | 5/2005 | Yu | B60L 8/006 290/44 |
| 8,169,182 B1 | 5/2012 | Kimble | |
| 8,253,262 B1 * | 8/2012 | Kiler | B60L 8/003 290/44 |
| 9,428,061 B1 * | 8/2016 | Ripley | B60L 8/006 |
| 10,358,038 B1 | 7/2019 | Ripley | |
| 2003/0155464 A1 * | 8/2003 | Tseng | B60L 8/003 244/58 |
| 2011/0031043 A1 * | 2/2011 | Armani | F03D 9/00 180/2.2 |
| 2013/0127393 A1 * | 5/2013 | Garcia | H02J 7/1415 320/101 |
| 2021/0017958 A1 * | 1/2021 | Pisharodi | B60K 25/08 |

* cited by examiner

*Primary Examiner* — Charles Reid, Jr.
(74) *Attorney, Agent, or Firm* — Donald J. Ersler (57) ABSTRACT

A wind turbine mountable to a motor vehicle preferably includes a wind blade, a turbine housing, an electrical generator and an electrical power converter. The wind blade preferably includes a plurality of blade elements, a top plate, a bottom plate and a support shaft. The turbine housing includes a turbine base plate, a turbine top plate and a peripheral side wall. A top shaft rotary bearing is retained in the turbine top plate. The electrical generator includes a generator rotor and a generator stator. The generator rotor is retained in the base plate. The bottom shaft thrust bearing is retained in the turbine base plate. The generator stator is mounted to the turbine base plate. The electrical leads of the generator stator are connected to an input of the electrical power converter. The electrical power converter converts the 120 volt AC signal to a suitable DC voltage.

18 Claims, 7 Drawing Sheets

WIND TURBINE MOUNTABLE TO A MOTOR VEHICLE

BACKGROUND OF THE INVENTION

1. Field of the Invention

The present invention relates generally to energy conservation and more specifically to a wind turbine mountable to a motor vehicle, which not only operates during forward movement of the motor vehicle, but is also capable of producing electricity when the vehicle is stationary.

2. Discussion of the Prior Art

U.S. Pat. No. 4,179,007 to Howe discloses a wind operated power generating apparatus. U.S. Pat. No. 8,169,182 to Kimble discloses a charging system for an electric vehicle. Ser. No. 10/358,038 to Ripley discloses a wind turbine for electric car.

Accordingly, there is a clearly felt need in the art for a wind turbine mountable to a motor vehicle, which not only operates during forward movement of the motor vehicle, but is also capable of producing electricity when the vehicle is stationary.

SUMMARY OF THE INVENTION

The present invention provides a wind turbine mountable to a motor vehicle, which generates electricity during forward movement of the motor vehicle. The wind turbine mountable to a motor vehicle (vehicle wind turbine) preferably includes a wind blade, a turbine housing, an electrical generator and an electrical power converter. The wind blade preferably includes a plurality of blade elements, a top plate, a bottom plate, a support shaft and an inner wall. A bottom of the plurality of blade elements are attached to the bottom plate and a top of the plurality of blade elements are attached to the top plate. The inner wall is formed adjacent an inner perimeter of the plurality of blade elements. An outer perimeter of the wind blade has a substantially circular shape. The support shaft is preferably retained in the top plate and the bottom plate.

The turbine housing includes a turbine base plate, a turbine top plate, a peripheral side wall and at least two inlet vanes. A front opening is formed through a front of the peripheral side wall to receive an air stream and a rear opening is formed through a rear of the peripheral side wall to allow the escape of the air stream. The at least two inlet vanes are formed in the front opening to direct air flow to the wind blade. A plurality of suction cups preferably extend downward from a bottom of the base plate, such that the vehicle wind turbine may be secured to a roof of a motor vehicle. A top shaft rotary bearing is retained in the turbine top plate and a bottom shaft thrust bearing is retained by the turbine bottom plate. The electrical generator includes a generator rotor and a generator stator. A direct drive motor from a washing machine may be used for the electrical generator. A hole is formed through a center of the bottom plate to retain the generator rotor. The generator stator is preferably mounted to a top of the turbine base plate. A bottom of the support shaft is preferably secured to a center of the generator rotor. The top shaft rotary bearing and the bottom shaft thrust bearing support and rotary retain the support shaft of the wind blade.

The electrical leads of the generator stator are attached to an input of the electrical power converter. The electrical power converter converts the 120 volt AC signal from the rotation of the generator rotor to any suitable DC voltage. In use, air flows through the front opening, which causes the wind blade to rotate inside the turbine housing. Rotation of the generator rotor generates a 120 volt AC signal, which is converted into a DC voltage for storage in a battery.

Accordingly, it is an object of the present invention to provide a wind turbine mountable to a motor vehicle, which not only operates during forward movement of the motor vehicle, but is also capable of producing electricity when the vehicle is stationary.

These and additional objects, advantages, features and benefits of the present invention will become apparent from the following specification.

DETAILED DESCRIPTION OF THE PREFERRED EMBODIMENTS

Figure 1:
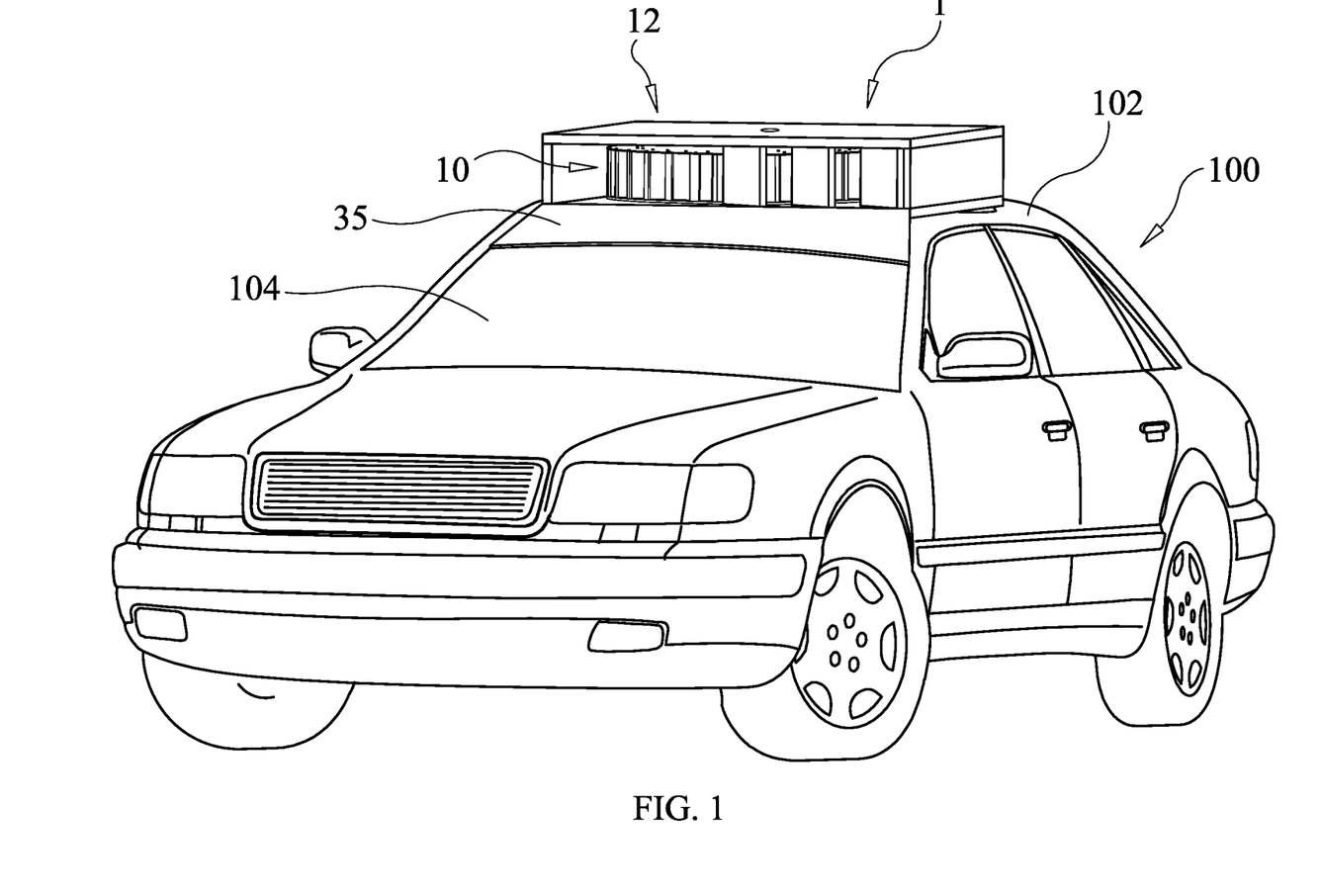
FIG. 1 is a front view of a vehicle wind turbine mounted to a roof of a motor vehicle in accordance with the present invention.
Figure 2:
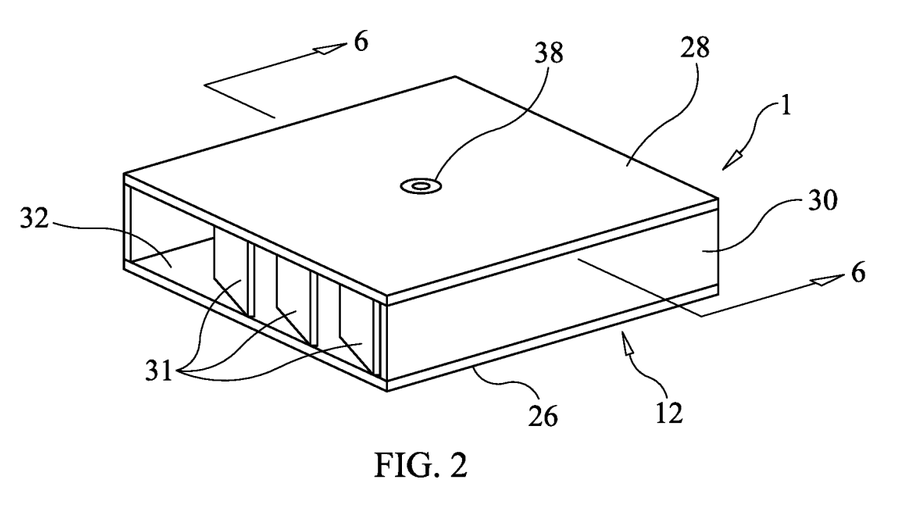
FIG. 2 is a perspective view of a vehicle wind turbine in accordance with the present invention.
Figure 3:
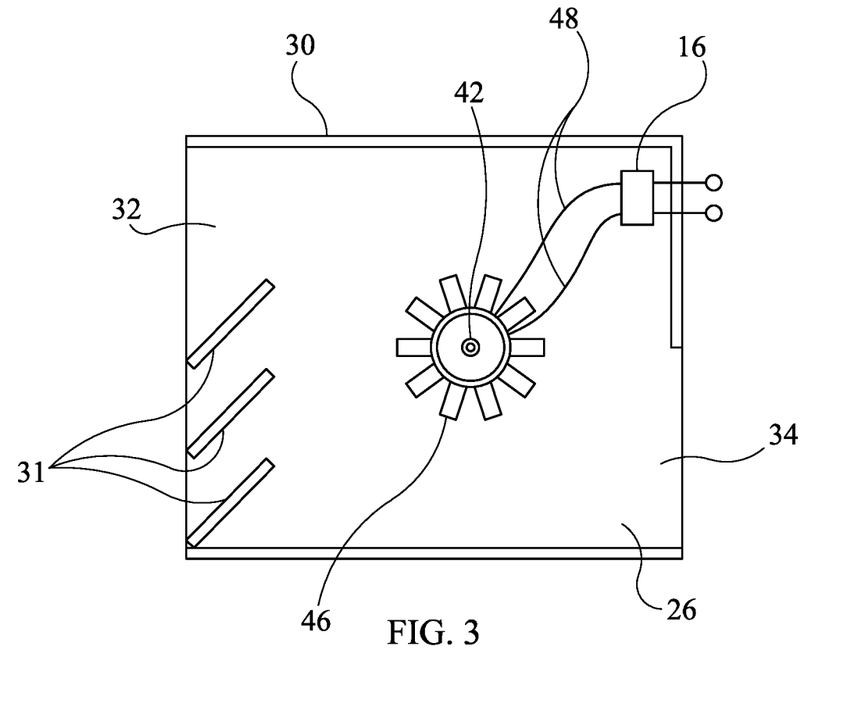
FIG. 3 is a top view a vehicle wind turbine with a turbine top plate and a wind blade removed to reveal a generator stator in accordance with the present invention.
Figure 4:
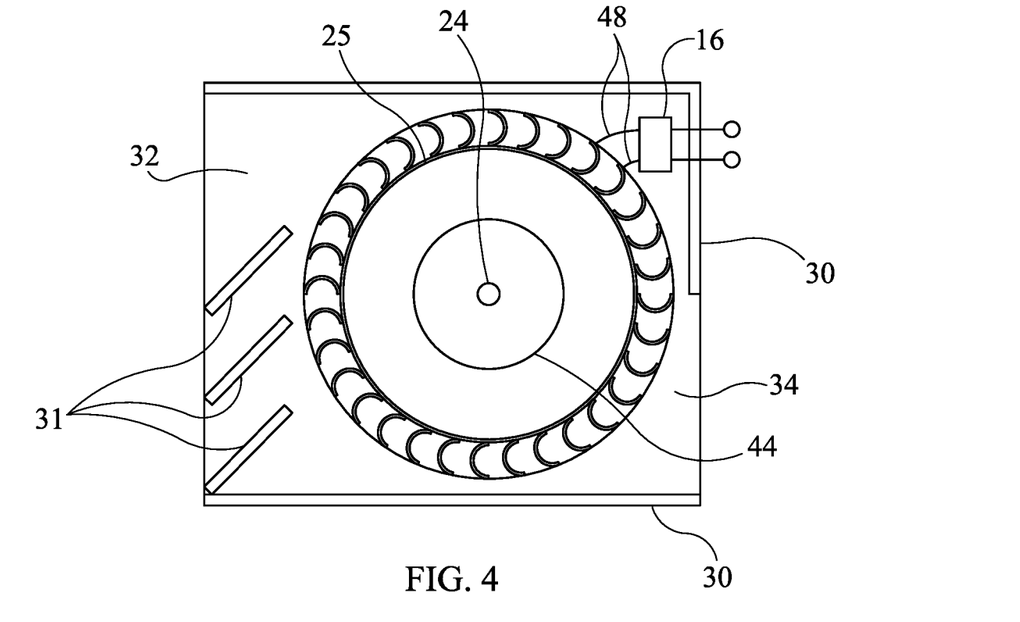
FIG. 4 is a top view a vehicle wind turbine with a turbine top plate and a top plate of the wind blade removed in accordance with the present invention.
Figure 5:
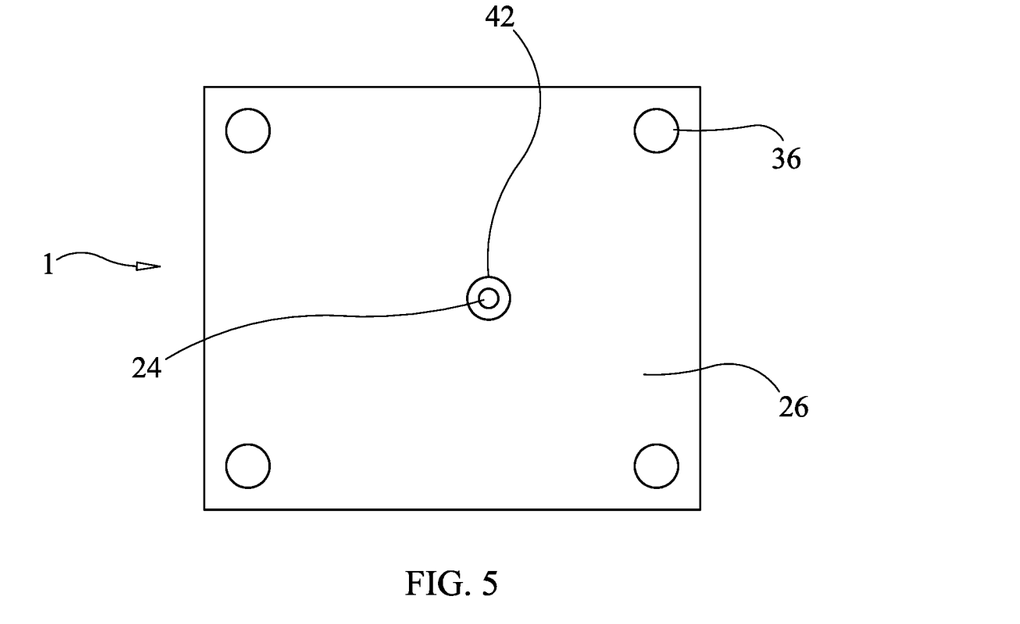
FIG. 5 is a bottom view of a vehicle wind turbine in accordance with the present invention.
Figure 6:
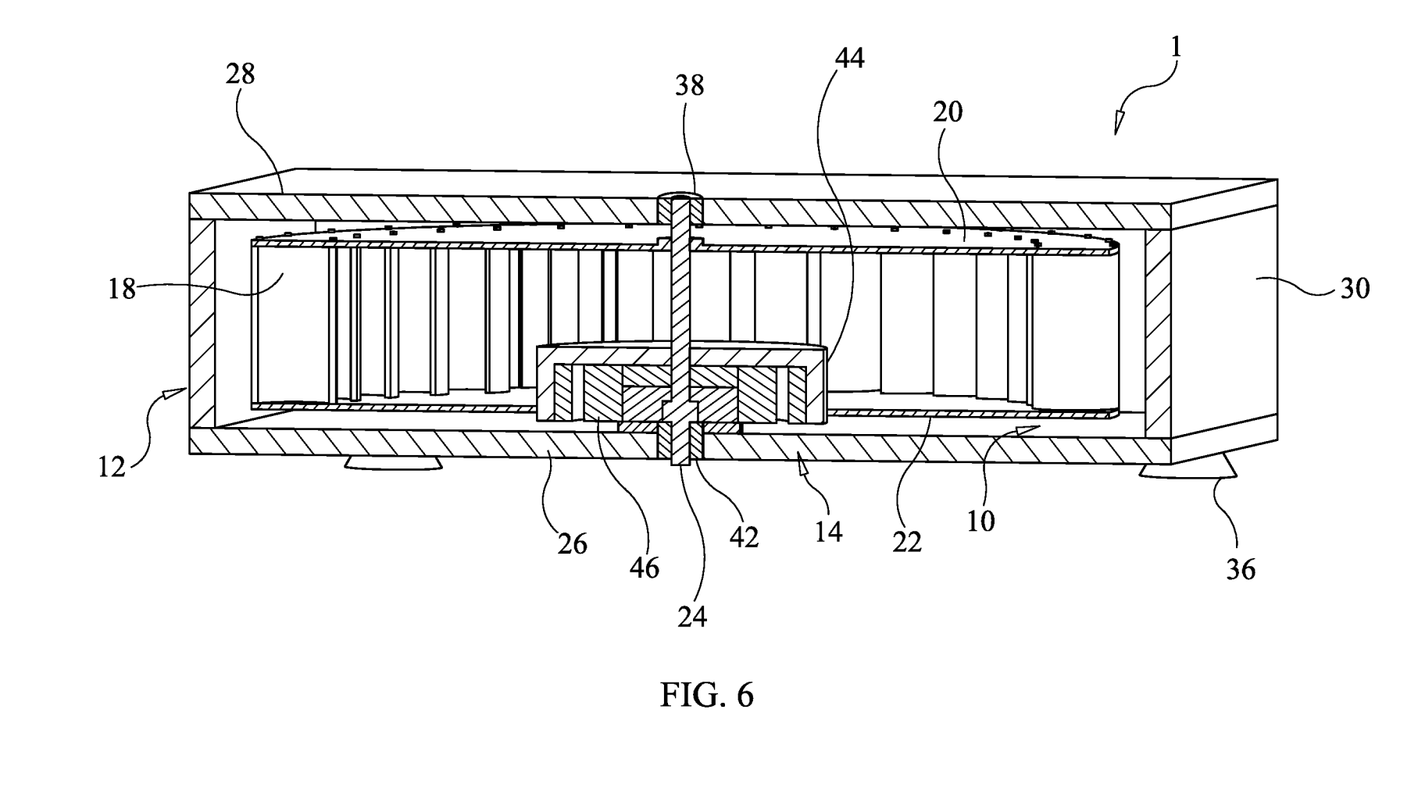
FIG. 6 is a cross sectional view cut through FIG. 2 of a vehicle wind turbine in accordance with the present invention.
Figure 6A:
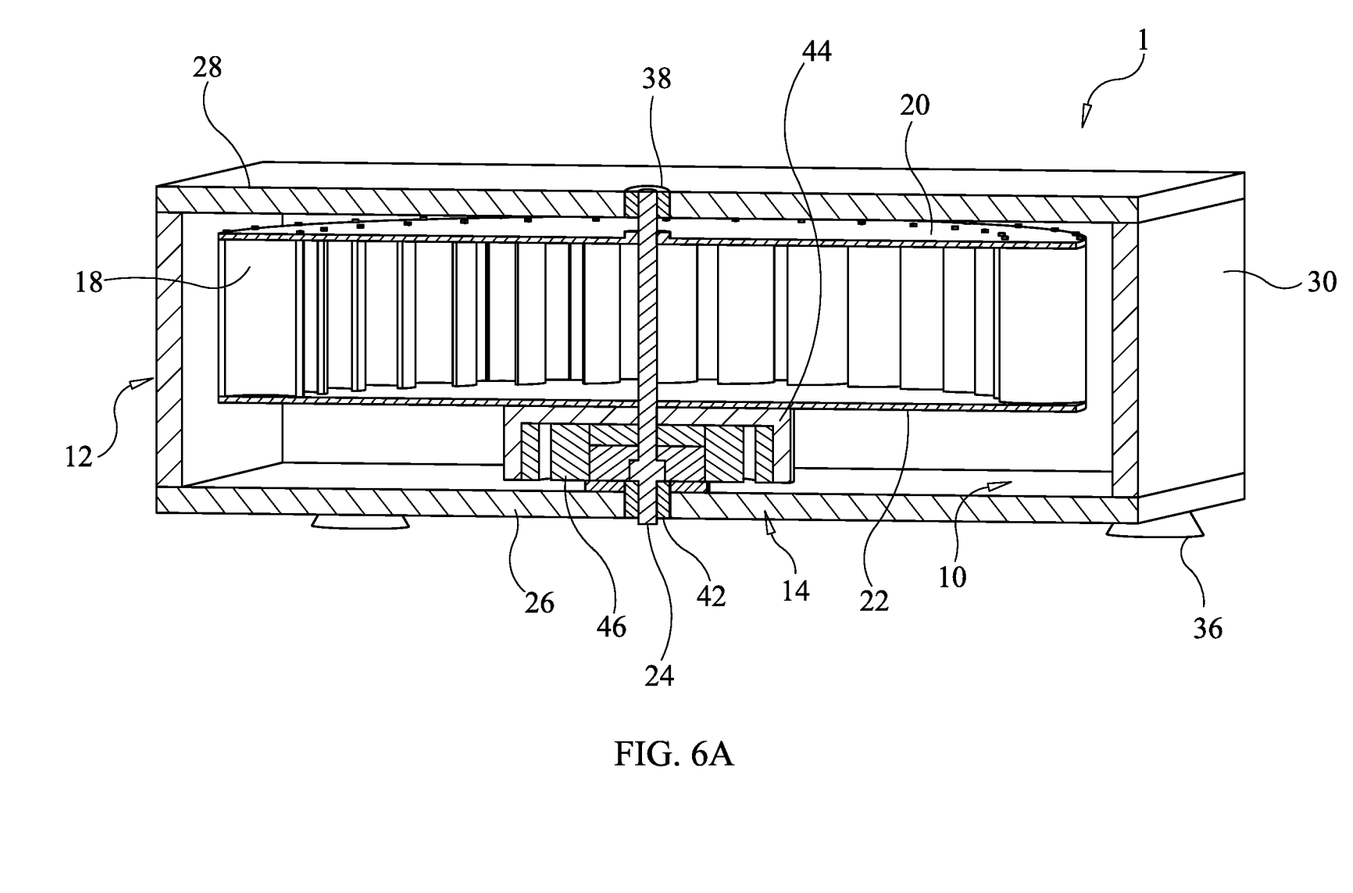
FIG. 6*a* is a cross sectional view of a modified FIG. 6, where an electrical generator is located below a wind blade of a vehicle wind turbine in accordance with the present invention.
Figure 7:
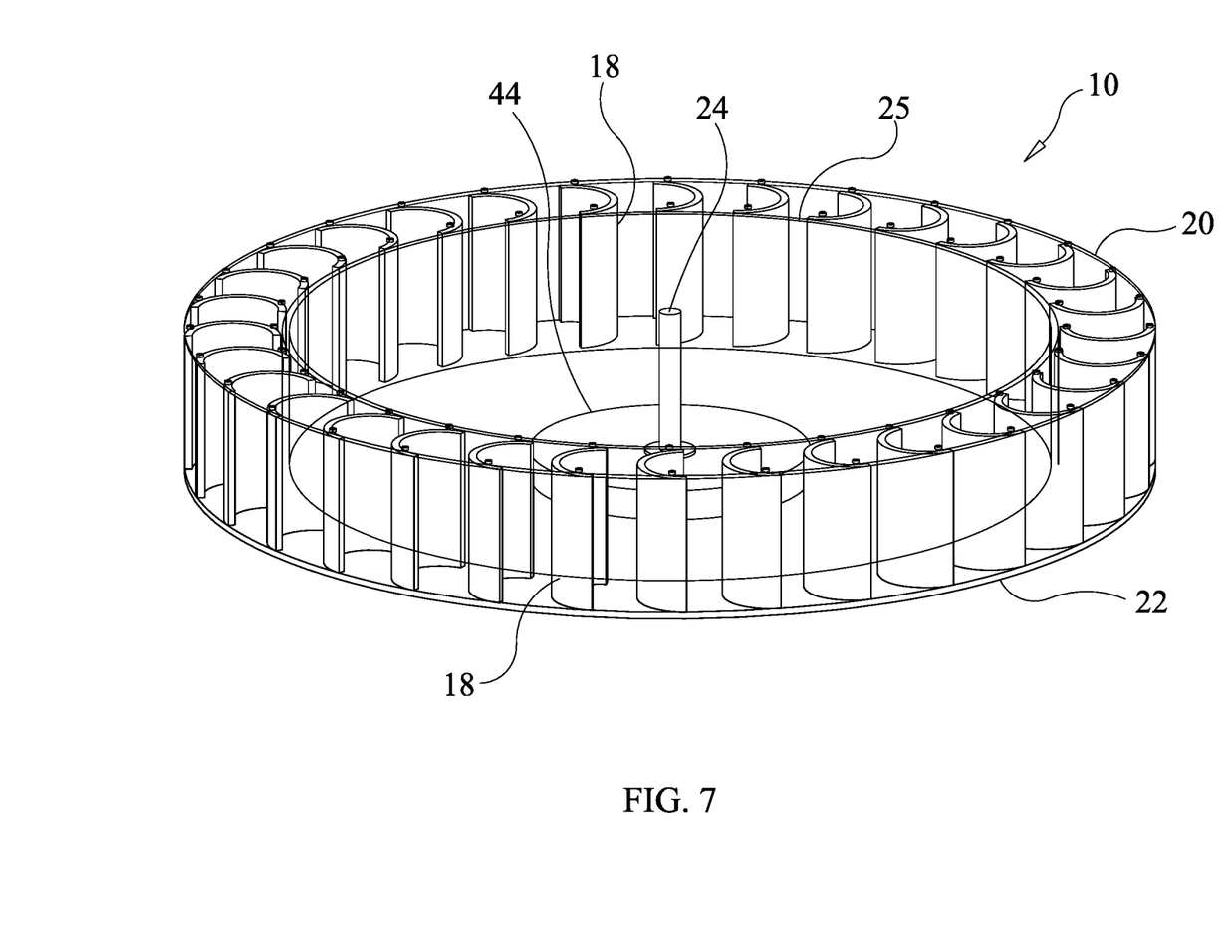
FIG. 7 is a perspective view of a wind blade of a vehicle wind turbine in accordance with the present invention.
Figure 7A:
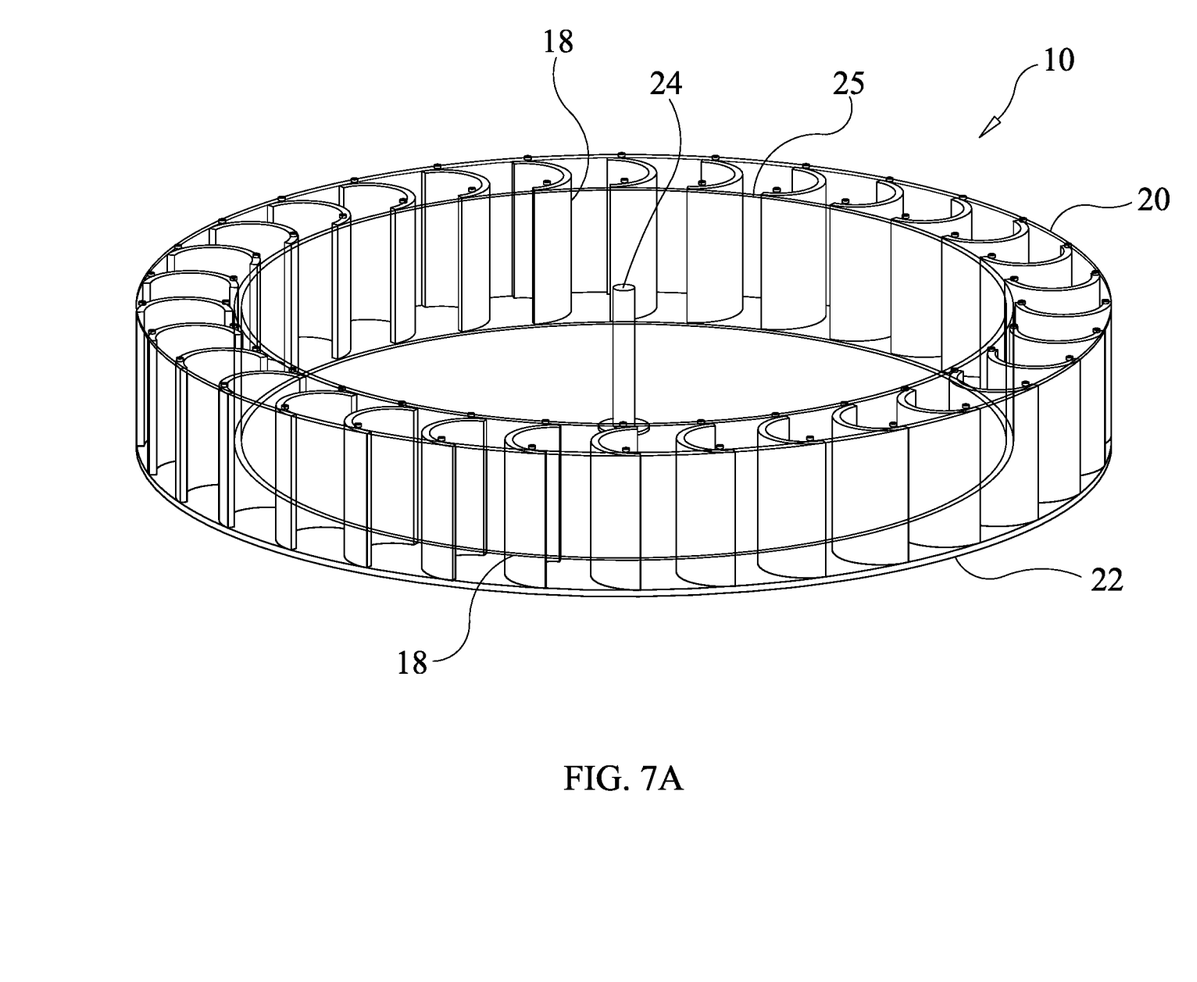
FIG. 7*a* is a perspective view of a wind blade of a vehicle wind turbine in accordance with the present invention.

With reference now to the drawings, and particularly to FIG. 2, there is shown a perspective view of a vehicle wind turbine 1. With reference to FIGS. 1 and 3-7, the vehicle wind turbine 1 preferably includes a wind blade 10, a turbine housing 12, an electrical generator 14 and an electrical power converter 16. The wind blade 10 preferably includes a plurality of blade elements 18, a top plate 20, a bottom plate 22, a support shaft 24 and an inner wall 25. A bottom of the plurality of blade elements 18 are attached to the bottom plate 22 with any suitable device or method and a top of the plurality of blade elements 18 are attached to the top plate with any suitable device or method. A cross sectional shape of the plurality of blade elements 18 may have any suitable contour or shape. The inner wall 25 is formed adjacent an inner perimeter of the plurality of blade elements. An outer perimeter of the wind blade 10 preferably has a substantially circular shape. The support shaft 24 is preferably retained in the top plate 20 and by the bottom plate 22.

The turbine housing 12 preferably includes a turbine base plate 26, a turbine top plate 28, a peripheral side wall 30 and at least two inlet vanes 31. A front opening 32 is formed through a front of the peripheral side wall 30 to receive an air stream and a rear opening 34 is formed through a rear of the peripheral side wall 30 to allow the escape of the air stream. The at least two inlet vanes 31 are formed in the front opening 32 to direct air flow to the wind blade 10. However, an exhaust opening could be formed through the peripheral side wall 30, which is not at a rear of the peripheral side wall 30. A plurality of suction cups 36 preferably extend downward from a bottom of the base plate 26, such that the vehicle wind turbine 1 may be secured to a roof 102 of a motor vehicle 100. An airfoil 35 preferably extends from a front edge of the turbine housing 12 adjacent a bottom of the front opening 32 and contacts a windshield 104 of the motor vehicle 100. The airfoil 35 directs air into the front opening 32.

A top shaft rotary bearing 38 is retained in the turbine top plate 28 and a bottom shaft thrust bearing 42 is retained in the turbine bottom plate 26. The electrical generator 14 includes a generator rotor 44 and a generator stator 46. A direct drive motor from a washing machine may be used for the electrical generator 14. A rotor hole is formed through a center of the bottom plate 22 to receive and retain the generator rotor 44. The generator stator 46 is preferably mounted to a top of the turbine base plate 26. The support shaft 24 is secured to the generator rotor 44 with any suitable device or method. The top shaft rotary bearing 38 and the bottom shaft thrust bearing 42 support and rotatably retain the support shaft 24 of the wind blade 10. With reference to FIGS. 6a-7a, the electrical generator 14 may also be mounted below the wind blade 10.

Electrical leads 48 of the generator stator are attached to an input of the electrical power converter 16. The electrical power converter 16 converts the 120 volt AC signal from the rotation of the generator rotor 44 to any suitable DC voltage. In use, air flows through the front opening 32, which causes the wind blade 10 to rotate inside the turbine housing 12. Rotation of the generator rotor 44 generates a 120 volt AC signal, which is converted into a DC voltage through the electrical power converter 16 for storage in a battery (not shown).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A wind turbine mountable to a motor vehicle comprising:
   a wind blade including a plurality of blade elements and a support shaft, said plurality of blade elements are located on an outer perimeter of said wind blade, said support shaft is located in a center of said wind blade;
   a turbine housing including a turbine top plate and a turbine bottom plate and a side wall, said turbine top plate is attached to a top of said side wall, said turbine bottom plate is attached to a bottom of said side wall; and
   an electrical generator includes a rotor and a stator, said rotor includes a rotor centerline, said rotor centerline is concentric with a centerline of said wind blade, most of a height of said rotor is contained in a height of said wind blade, an entire outer perimeter of said rotor makes contact with an inner perimeter of said wind blade, wherein said rotor rotates in the same direction as said wind blade, said support shaft is secured in said rotor, said stator is mounted to said turbine bottom plate, wherein said support shaft of said wind blade is pivotally retained in said turbine housing, wherein rotation of said wind blade by air flow causes said electrical generator to output an electrical signal.

2. The wind turbine mountable of claim 1, further comprising:
   a top shaft rotary bearing is retained in said turbine top plate to rotatably retain a top of said support shaft, a bottom shaft thrust bearing is retained in said turbine bottom plate to rotatably retain a bottom of said support shaft.

3. The wind turbine mountable of claim 1 wherein:
   said electrical power converter converting an AC voltage to a DC voltage.

4. The wind turbine mountable of claim 1, further comprising:
   a plurality of suction cups extending from a bottom of said turbine bottom plate.

5. The wind turbine mountable of claim 1, further comprising:
   an airfoil extends from a front of said turbine housing and contacts a windshield of the motor vehicle.

6. The wind turbine mountable of claim 1, further comprising:
   an inner wall is formed adjacent an inner perimeter of said plurality of blade elements.

7. A wind turbine mountable to a motor vehicle comprising:
   a wind blade including a plurality of blade elements and a support shaft, said plurality of blade elements are located on an outer perimeter of said wind blade, said support shaft is located in a center of said wind blade;
   a turbine housing including a turbine top plate and a turbine bottom plate and a peripheral side wall, a front opening is formed across an entire front of said turbine housing, an exhaust opening is formed through said peripheral side wall, said turbine top plate is attached to a top of said peripheral side wall, said turbine bottom plate is attached to a bottom of said peripheral side wall;
   at least two inlet vanes are located in less than an entire length of said front opening; and
   an electrical generator includes a rotor and a stator, said rotor is secured to said wind blade, said rotor is secured to said support shaft, said stator is mounted to said turbine bottom plate, wherein said support shaft of said wind blade is pivotally retained in said turbine housing, wherein rotation of said wind blade by air flow causes said electrical generator to output an electrical signal.

8. The wind turbine mountable of claim 7, further comprising:
   a top shaft rotary bearing is retained in said turbine top plate to rotatably retain a top of said support shaft, a bottom shaft thrust bearing is retained in said turbine bottom plate to rotatably retain a bottom of said support shaft.

9. The wind turbine mountable of claim 7, wherein:
   said electrical power converter converting an AC voltage to a DC voltage.

10. The wind turbine mountable of claim 7, further comprising:
    a plurality of suction cups extending from a bottom of said turbine bottom plate.

11. The wind turbine mountable of claim 7, further comprising:

an airfoil extends from a front of said turbine housing and contacts a windshield of the motor vehicle.

12. The wind turbine mountable of claim 7, further comprising:
an inner wall is formed adjacent an inner perimeter of said plurality of blade elements.

13. A wind turbine mountable to a motor vehicle comprising:
a wind blade including a plurality of blade elements, a top plate, a bottom plate and a support shaft, said plurality of blade elements are located between said top and bottom plates;
a turbine housing including a turbine top plate and a turbine bottom plate, a rear wall and two peripheral side walls, a front opening is formed across an entire front of said turbine housing, said turbine top plate is attached to a top of said two peripheral side walls and said rear wall, said turbine bottom plate is attached to a bottom of said two peripheral side walls;
at least two inlet vanes are located in less than an entire length of said front opening, an exhaust opening is formed through a portion of said rear wall directly behind said at least two inlet vanes; and
an electrical generator includes a rotor and a stator, said rotor is secured to said wind blade, said stator is mounted to said turbine bottom plate, wherein rotation of said wind blade by air flow causes said electrical generator to output an electrical signal.

14. The wind turbine mountable of claim 13, further comprising:
a top shaft rotary bearing is retained in said turbine top plate to rotatably retain a top of said support shaft, a bottom shaft thrust bearing is retained in said turbine bottom plate to rotatably retain a bottom of said support shaft.

15. The wind turbine mountable of claim 13, wherein:
said electrical power converter converting an AC voltage to a DC voltage.

16. The wind turbine mountable of claim 13, further comprising:
a plurality of suction cups extending from a bottom of said turbine bottom plate.

17. The wind turbine mountable of claim 13, further comprising:
an airfoil extends from a front of said turbine housing and contacts a windshield of the motor vehicle.

18. The wind turbine mountable of claim 13, further comprising:
an inner wall is formed adjacent an inner perimeter of said plurality of blade elements.

\* \* \* \* \*